Figure 1:
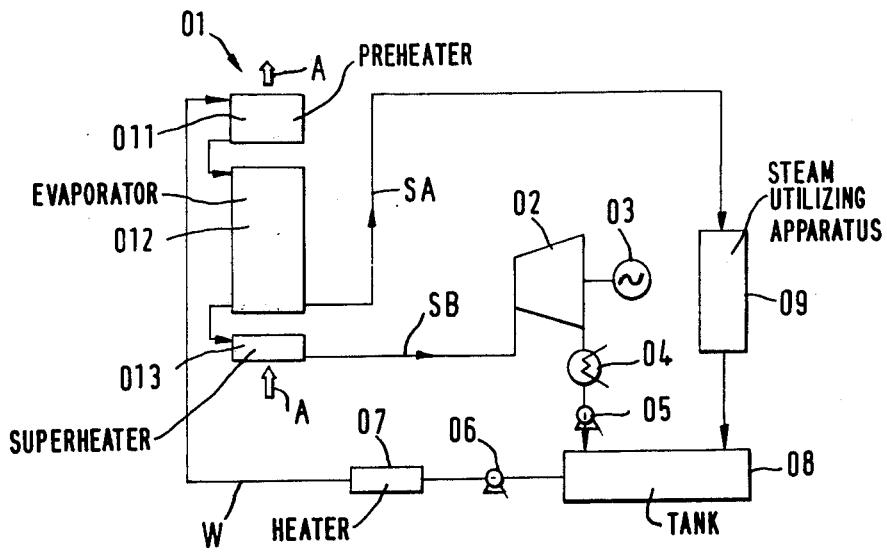

United States Patent [19]

Nagashima et al.

[11] 4,214,450
[45] Jul. 29, 1980

[54] APPARATUS FOR RECOVERING HEAT FROM EXHAUST GASES OF MARINE PRIME MOVERS

[75] Inventors: Kiyoshi Nagashima, Yokohama; Tsugutoshi Yamada, Kashiwa, both of Japan

[73] Assignee: Mitsubishi Jukogyo Kabushiki Kaisha, Tokyo, Japan

[21] Appl. No.: 886,583

[22] Filed: Mar. 14, 1978

[30] Foreign Application Priority Data

Apr. 19, 1977 [JP] Japan .................................. 52-45032

[51] Int. Cl.² ............................................. F01K 17/00
[52] U.S. Cl. ........................................ 60/648; 60/670; 60/39.18 B
[58] Field of Search .................. 60/643, 645, 648, 655, 60/670, 39.18 B

[56] References Cited

U.S. PATENT DOCUMENTS 3,990,230  11/1976  Kuwashima et al. ........... 60/39.18 B

FOREIGN PATENT DOCUMENTS 1201612  9/1965  Fed. Rep. of Germany ...... 60/39.18 B
738286  10/1955  United Kingdom ................ 60/39.18 B
964216  7/1964  United Kingdom ................ 60/39.18 B

*Primary Examiner*—Allen M. Ostrager
*Assistant Examiner*—Stephen F. Husar
*Attorney, Agent, or Firm*—Wenderoth, Lind & Ponack

[57] ABSTRACT

An apparatus for recovering heat from the exhaust gases of marine prime movers of the kind including an exhaust gas economizer for effecting heat exchange between the exhaust gas discharged from the prime mover and feed water supplied under pressure from a feed water tank. The apparatus has a pressure regulator device for regulating the pressure of the feed water to provide sources of relatively high and low pressure feed water; a high pressure steam generator section in the exhaust gas economizer to receive high pressure feed water to generate high pressure steam for use in driving a steam turbine; a low pressure steam generator section in the economizer to receive low pressure feed water to generate general purpose steam for use for purposes other than driving the steam turbine; a low pressure steam separating device at the outlet of the low pressure steam generator section for separating saturated water from the general purpose steam; and a primary feed water preheater in a line connecting the feed water tank to the low pressure steam generator section for mixing the saturated water separated by the low pressure steam separator device and the feed water supplied from the feed water tank to the exhaust gas economizer and thereby preheating the feed water.

3 Claims, 8 Drawing Figures

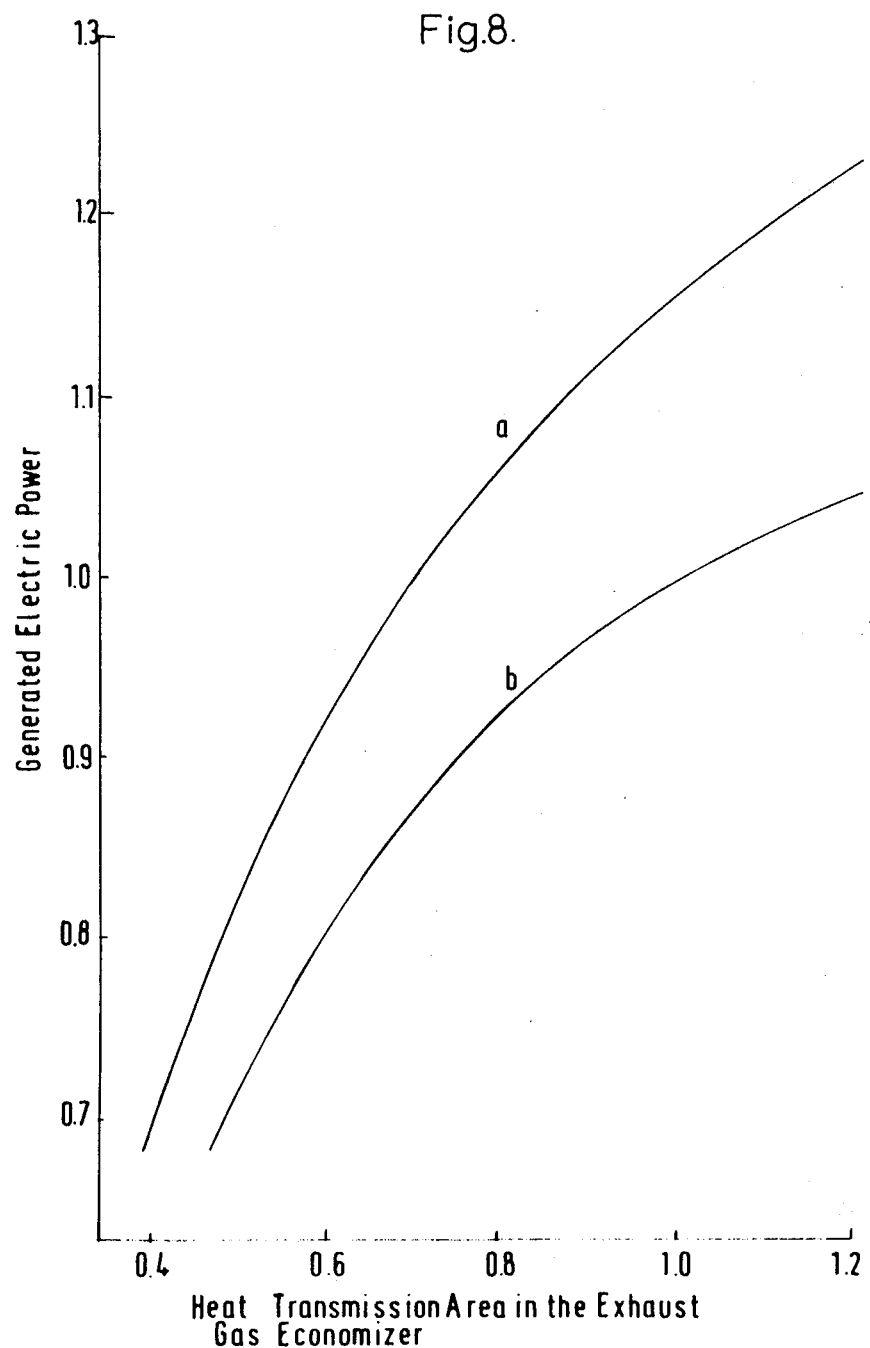

APPARATUS FOR RECOVERING HEAT FROM EXHAUST GASES OF MARINE PRIME MOVERS

This invention relates to apparatus for recovering heat from the exhaust gases of marine prime movers (e.g. diesel engines and gas turbines) of the kind including a so-called exhaust gas economizer for effecting heat exchange between the exhaust gases discharged from the prime mover and feed water supplied from a feed water tank.

In general, in ships which use diesel engines or gas turbines as principal engines, steam is required both for driving a turbo-generator which provides marine electric power and for general service purposes such as for heating the fuel oil.

Such steam is generated in an exhaust gas economizer by heating water with exhaust gas discharged from an engine serving as a heat source. More particularly, in apparatus of the prior art, saturated steam having a single pressure is generated in an exhaust gas economizer, and a part of the steam is utilized as general purpose steam, while the remainder is superheated and thereafter used for driving a turbo-generator. In order to increase the generation of electric power in a turbo-generator, a large value of (The quantity of heat recovered from the exhaust gas in an exhaust gas economizer) × (the thermal efficiency of the cycle)

must be selected and to obtain the same electric power, as the steam pressure is reduced the quantity of heat to be recovered must be increased, because in association with a reduction of the steam pressure the thermal efficiency of the cycle is also reduced. On the other hand, with regard to general purpose steam, when it is intended to do the same amount of work, even if the steam pressure is reduced there is no need to increase the quantity of heat to be recovered. Thus, the problem which has existed in prior art apparatus is that two kinds of steam having different requirements have to be extracted at the same pressure.

Accordingly, in prior art apparatus for recovering heat from exhaust gases as described above, it is impossible to increase the generation of electric power over a wide range by merely regulating the steam pressure, and so, this type of heat recovery apparatus tends to be economically unacceptable in ships equipped with medium to low power output prime movers, although they can be economically used in ships equipped with high power output prime movers.

It is one object of the present invention to provide apparatus for recovering heat from the exhaust gases of marine prime movers, in which generation of electric power in a turbo-generator is increased as compared to the similar heat recovery apparatus of the prior art.

Another object of the present invention is to provide apparatus for recovering heat from the exhaust gases of marine prime movers in which, under the same electric power generating condition, the exhaust gas economizer can be made more compact and cheaper than the similar heat recovery apparatus of the prior art.

According to the present invention, apparatus for recovering heat from the exhaust gases of marine prime movers of the kind including an exhaust gas economizer for effecting heat exchange between the exhaust gases discharged from the prime mover and feed water supplied from a feed water tank; comprises a pressure regulator device for regulating the pressure of said feed water to provide sources of relatively high pressure and low pressure feed water; an exhaust gas economizer including a high pressure steam generator section adapted to receive high pressure feed water to generate high pressure steam for use in driving a steam turbine, and a low pressure steam generator section adapted to receive low pressure feed water to generate general purpose steam for use for purposes other than driving said steam turbine; is provided a low pressure steam separator device is provided at the outlet of said low pressure steam generator section for separating saturated water from said general purpose steam and is provided a primary feed water preheater is provided in a line connecting said feed water tank to said low pressure steam generator section for mixing the saturated water separated by said low pressure steam separator device and the feed water supplied from said feed water tank to said exhaust gas economizer and thereby preheating said feed water.

Thus, the invention provides the following features:

(1.) The pressure of the feed water introduced into the exhaust gas economizer is regulated by means of a pressure regulator device to provide sources of high and low pressure feed water. The interior of the said exhaust gas economizer is divided into a high pressure steam generator section to which high pressure feed water is introduced and a low pressure steam generator section to which low pressure feed water is introduced. The high pressure steam generated in said high pressure steam generator section is used as steam for driving a steam turbine, while the low pressure steam generated in said low pressure steam generator section is used as general purpose steam, and a low pressure steam separator device is provided in the line for the low pressure general purpose steam in which saturated water is separated and is then mixed with the feed water supplied to the exhaust gas economizer within a primary feed water heater.

(2) In addition to the above feature (1), a secondary feed water preheater for effecting heat exchange between the feed water and the surplus steam at high pressure extracted from the high pressure steam line as well as surplus steam at low pressure extracted from the general purpose steam line is provided to achieve effective utilization of both kinds of steam.

Figure 2:
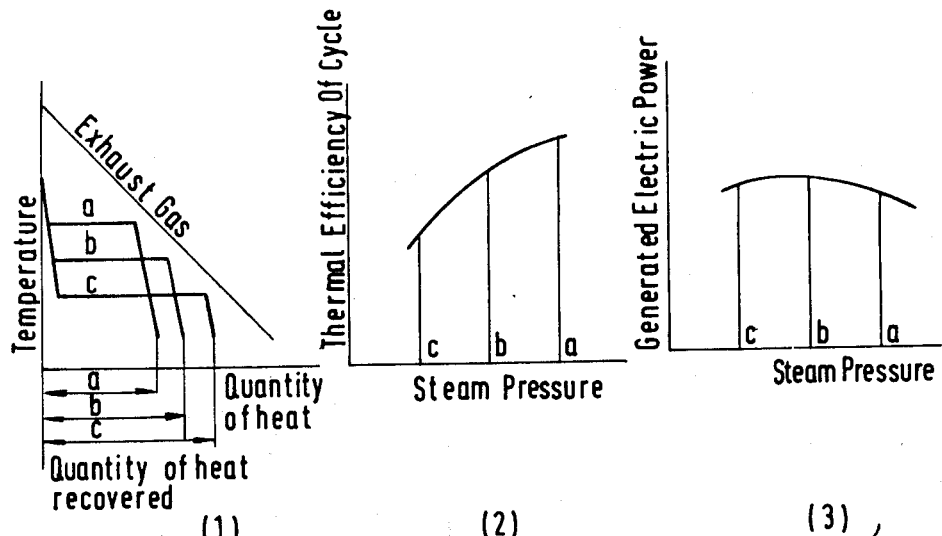
Figure 3:
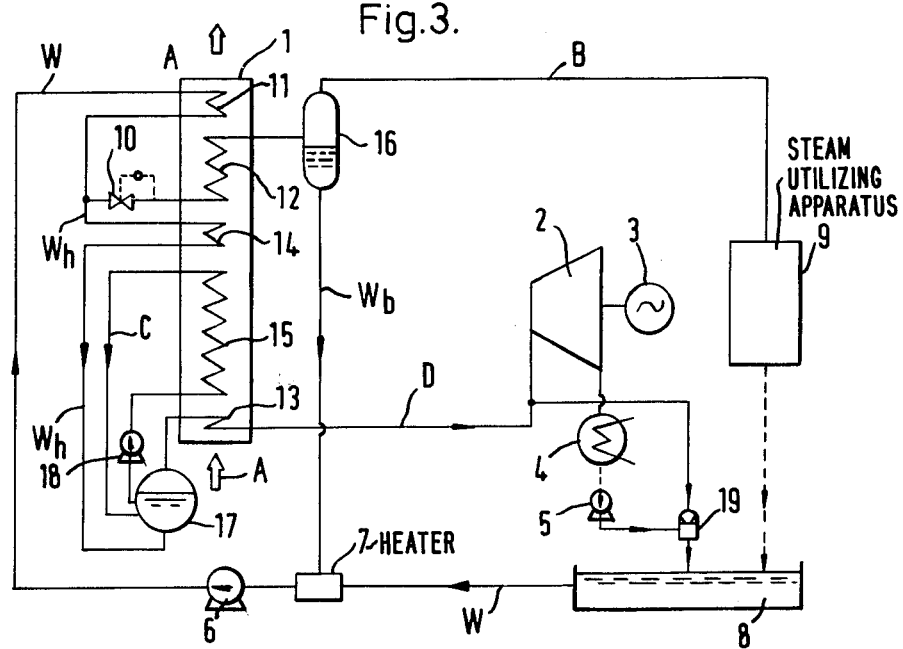
Figure 4:
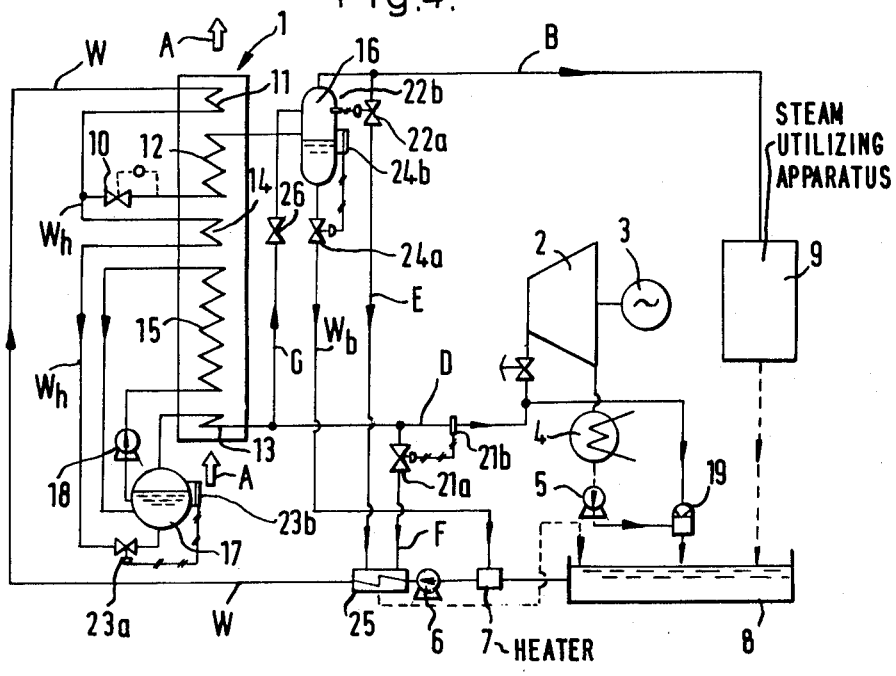
Figure 5:
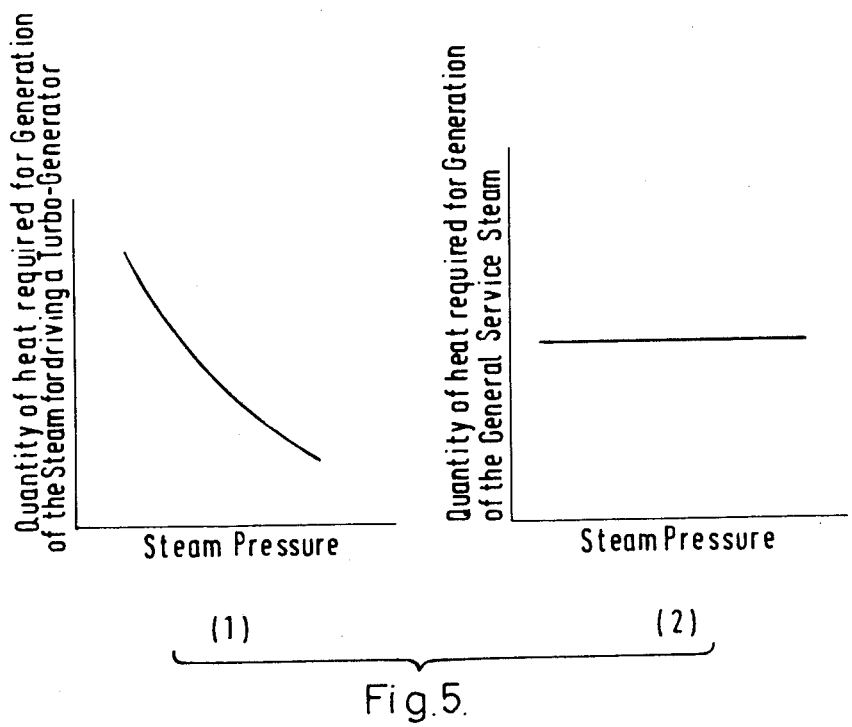

These and other features and objects of the present invention will become more apparent with reference to the following description taken in conjunction with the accompanying drawings, in which:

FIG. 1 is a diagram of a prior art apparatus for recovering heat from exhaust gases, FIGS. 2(1)–2(3) are graphs representing the performance of the prior art apparatus, FIG. 3 is a diagram similar to FIG. 1 showing one preferred embodiment of the apparatus according to the present invention, FIG. 4 is a diagram similar to FIG. 3 showing another preferred embodiment of apparatus according to the present invention, and FIGS. 5(1) to 8 are graphs representing the performance of the embodiments of the apparatus according to the present invention.

Before entering into a detailed description of the preferred embodiments of apparatus according to the present invention, one example of a prior art apparatus for recovering heat from exhaust gases will be described with reference to FIGS. 1 and 2.

Referring to FIG. 1, an exhaust gas economizer 01 consists of a preheating section 011, an evaporating section 012 and a superheating section 013. Steam from the economizer 01 is fed to a steam turbine 02 to which a generator 03 is directly coupled. Steam exhausted from the steam turbine 02 is then fed via a condenser 04, a condensate pump 05 heater to a feed water tank 08.

Exhaust gas A discharged from a prime mover such as a diesel engine (not shown) is introduced into the exhaust gas economizer 01, and after it has been subjected to heat exchange with feed water W, which is introduced from the feed water tank 08 via the feed water heater 07 by means of the feed water pump 06, it is exhausted externally. More particularly, the feed water W which has been preheated to a certain extent by the feed water heater 07, enters the preheating section 011 in the exhaust gas economizer 01 to be heated by means of heat exchange with the exhaust gas A; thereafter the feed water W enters the evaporating section 012 to be subjected to heat exchange with the exhaust gas A which is at a higher temperature than that within the preheating section 011, and is converted into saturated steam. A part SA of the saturated steam generated in the evaporating section 012 is supplied to a device or instrument 09, such as a fuel preheater which uses general purpose steam, while the remaining saturated steam enters the superheater 013 to be subjected to heat exchange with the exhaust gas A, which is at an even higher temperature than that within the evaporating section 012, and is converted into superheated steam SB which is then supplied to the steam turbine 02 to drive the same. The steam exhausted from the steam turbine 02 is then condensed in the condenser 04, and thereafter the condensate is supplied to the feed water tank 08 via the condensate pump 05.

It is to be noted that the general purpose steam which has been used at any desired location and then condensed is also introduced into the feed water tank 08. In other words, in the prior art apparatus, saturated steam having a single pressure is generated by the exhaust gas economizer 01 and a part of the saturated steam is utilized as general purpose steam, while the remainder is utilized, after having been superheated, as steam for driving a turbo-generator.

Here it is to be noted that in order to increase the generation of electric power in the turbo-generator, a large value of (the quantity of heat recovered from the exhaust gas
in an exhaust gas economizer)×(the thermal
efficiency of the cycle)

must be selected. However as illustrated in FIG. 2, in the apparatus for recovering heat from exhaust gases in the prior art, the following tendencies exist:

(1) If the steam pressure is lowered in the sequence a, b and c, then the thermal efficiency of the cycle is lowered as illustrated in FIG. 2(2), whereas the quantity of heat recovered by the steam in the exhaust gas economizer 01 will increase in the order of a→b→c as shown in FIG. 2(1).

(2) On the other hand, if the thermal efficiency of the cycle is enhanced in the order of c→b→a as shown in FIG. 2(2) by increasing the steam pressure in the sequence of c→b→a, then the quantity of heat recovered is reduced in the order of c→b→a as shown in FIG. 2(1).

Therefore, the optimum steam pressure at which the generation of electric power in the turbo-generator becomes a maximum can be attained by regulating the steam pressure as illustrated in FIG. 2(3). However, in the above-described prior art apparatus it is impossible to increase the generation of electric power over a wide range by merely regulating the steam pressure, and so, this type of heat recovering apparatus tends to be economically unacceptable in ships equipped with medium to low output power prime movers, although it can be used economically in ships equipped with high power output prime movers.

Referring now to FIG. 3, in one preferred embodiment of apparatus according to the present invention there is provided a steam turbine 2, to which a generator 3 is directly coupled, a condenser 4, a condensate pump 5, a feed water pump 6, a feed water tank 8 and a device or instrument 9 which utilizes general purpose steam, and the arrangement and functions of these component elements are the same as those described hereinbefore for the prior art apparatus. A condenser/ejector arrangement 19 is also provided in this embodiment to which condensate is fed from the pump 5.

An exhaust gas economizer 1 is included, which consists of a primary preheater 11, a low pressure steam generator 12, a secondary preheater 14, a high pressure steam generator 15, and a superheater 13. A pressure regulator device 10 is disposed in a feed water outlet line from the primary preheater 11; said device may be a reducing valve as shown, or a booster pump, etc. In use, exhaust gas A discharged from a prime mover such as a diesel engine (not shown) is fed into the exhaust gas economizer 1 and passes in sequence over the superheater 13, the high pressure steam generator 15, the secondary preheater 14, the low pressure steam generator 12 and the primary preheater 11; after having effected heat exchange with the feed water or steam flowing through these respective components, it is exhausted externally.

A low pressure steam separator 16 is provided at the steam outlet of the low pressure steam generator 12, in which saturated water $W_b$ is separated from the general purpose steam B. A high pressure steam separator 17 is provided in a high pressure steam line connecting the high pressure steam generator 15 to the superheater 13, in which water is separated from the high pressure steam C, a circulating water pump 18 being provided for circulating the water from the separator through the high pressure steam generator 15. A primary feed water heater 7 is provided in the feed water line connecting the feed water tank 8 to the exhaust gas economizer 1, to which preheater the saturated water $W_b$ from the low pressure steam separator 16 is introduced.

Explaining now the operation of the heat recovery apparatus constructed as described above in greater detail, feed water W, which is supplied under pressure from the feed water tank 8 through the primary feed water heater 7 by means of the feed water pump 6, is fed to the primary preheater 11 in the exhaust gas economizer 1. The feed water W in the preheater 11 is then heated up to a temperature close to the saturation temperature, corresponding to the pressure preset by the pressure regulator device 10, through heat exchange with the exhaust gas A, and thereafter a part of the heated feed water W is fed, through the pressure regulator device 10, where the pressure is reduced, to the low pressure steam generator 12, and the other part of $W_h$ of the heater feed water is fed to the secondary preheater 14 without the pressure being regulated. (While the operation of the system is as described feed water $W_h$ is fed to the secondary preheater 14 after the pressure is boosted by the pressure regulator device 10, and the remaining part is fed to the low pressure steam generator 12 feed water W is fed to the secondary preheater when boosted in pressure by the pressure regulator device 10, and the remaining part $W_h$ is fed to the secondary. In the low pressure steam generator 12, the feed water W which, of course, is at a low pressure is subjected to heat exchange with the exhaust gas A which is at a higher temperature than in the primary preheater 11, and thereby low pressure steam B is generated. This low pressure steam B is introduced into the low pressure steam separator 16, where water $W_b$ is separated out, and thereafter to the device or instrument 9 utilizing general purpose steam. It is then returned to the feed water tank 8. The water $W_b$, which is at a high temperature, is fed to the primary feed water heater 7, where it is mixed with feed water W fed directly from the feed water tank 8; thereby the temperature of the feed water W can be raised.

The rate of ratio of the circulation in the low pressure steam system i.e., the rate od circulation of the water $W_b$, to the flow rate of the feed water W, hereinafter referred to as the circulation ratio, is uniquely correlated to the feed water outlet temperature of the primary feed water heater 7. In the preferred embodiment illustrated in FIG. 3, for a circulation ratio of ¼–1/5 a feed water temperature in the range 90° C.–110° C. can be obtained.

On the other hand, the high pressure feed water $W_h$ which by-passes the pressure regulator device 10 is introduced into the secondary preheater 14, and after this feed water has been heated up to the temperature close to a saturation temperature corresponding to the pressure regulated by the pressure regulator device 10 by heat exchange with the exhaust gas A which is at a higher temperature than in the low pressure steam generator 12, it enters the high pressure steam separator 17, where steam is partly separated. Thereafter the high pressure feed water is supplied under pressure to the high pressure steam generator 15 by means of the circulating water pump 18. In the high pressure steam generator 15, the high pressure feed water $W_h$ is subjected to heat exchange with the exhaust gas A which is at an even higher temperature than in the secondary preheater 14, and thereby high pressure saturated steam C can be generated. This saturated steam C is returned to the high pressure steam separator 17 through a circulating line connecting the high pressure steam generator 15 to the high pressure steam separator 17. After the water has been separated in the high pressure steam separator 17, the saturated steam is supplied to the superheater 13, where it is converted into high-temperature high-pressure superheated steam D by heat exchange with the exhaust gas A which is at the highest temperature supplied from the prime mover, and then it is supplied to the steam turbine 2 to drive the same. A by-pass line connects the line for the superheated steam D to the ejector of the arrangement 19.

It is to be noted that in the high pressure steam separator 17, the water separated from the saturated steam C is mixed with the above-referred to high pressure feed water $W_h$, and that they are jointly circulated by means of the circulating water pump 18 through the aforementioned circulating line and through the high pressure steam generator 15.

Referring to FIG. 4, another preferred embodiment of apparatus according to the present invention is illustrated, which is different from the FIG. 3 embodiment in that there are additionally provided high pressure steam pressure regulator devices 21a and 21b for regulating the pressure of the high pressure steam D supplied to the steam turbine 2, low pressure steam pressure regulator devices 22a and 22b for regulating the pressure of the general purpose steam B, a secondary feed water heater 25 for heating the feed water W with surplus steam extracted by these high-pressure/low-pressure steam pressure regulator devices, high-pressure/low-pressure steam separator water level regulator devices 23a, 23b, 24a and 24b for controlling the water levels within the high pressure steam separator 17 and the low pressure steam separator 16, respectively, and a by-pass valve 26. More particularly, in FIG. 4, with respect to the general purpose steam B, the pressure within the low pressure steam separator 16 is detected by the pressure detector 22b which actuates the pressure control valve 22a, so that when this pressure exceeds a predetermined value, the pressure control valve 22a is automatically opened to supply the surplus steam E to the secondary feed water heater 25. With respect to the high pressure steam D, this pressure can also be controlled in a similar manner by the pressure detector 21b and the pressure control valve 21a, and the surplus steam F is supplied to the secondary feed water heater 25. In addition, the water level within the low pressure steam separator 16 can be held at a predetermined position, by means of the water level detector 24b for detecting the water level, and the water level control valve 24a which responds to the detected signal for the water level applied to its input for automatically opening and closing the line for the saturated water $W_b$, and further, the water level within the high pressure steam separator 17 is also held at a predetermined position, likewise by means of the water level detector 23b and the water level control valve 23a. The secondary feed water heater 25 is a conventional heat exchanger, in which the feed water W can be heated by effecting heat exchange between said feed water W and the surplus steam E and F fed from the line for the general purpose steam B and the line for the high pressure steam D, respectively. The by-pass valve 26 is adapted to be opened for communicating the by-pass line G to supply high pressure steam D to the side of the general purpose steam B, in the case where the need for the general purpose steam B has become large.

As described above, according to the present invention, all the feeding and exhausting of water to and from the exhaust gas economizer, such as the feeding of water from the feed water tank to the exhaust gas economizer, the circulation of the low pressure feed water through the low pressure steam generator section, the circulation of the high pressure feed water through the high pressure steam generator section, etc., can be achieved by means of two feed water pumps, that is, the low pressure feed water pump 6 and the high pressure feed water pump 18.

In general, the pressure of the high pressure steam D is in the range 5–10 kg/cm² g, while the pressure of the low pressure steam B is in the range 2–3 kg/cm² g.

While the preferred embodiments of the apparatus according to the present invention have been described above in some detail, the advantages of the present invention over the prior art apparatus will now be discussed in greater detail.

The requirements for the steam for driving a turbo-generator and the general purpose steam are illustrated in FIGS. 5(1) and 5(2). With reference to FIG. 5(1), in the case of the steam for driving a turbo-generator, in order to obtain a given amount of electric power, as the steam pressure $P_2$ is reduced the quantity of heat $Q_1$ to be recovered must be increased. This is because the thermal efficiency of the cycle is reduced in association with the reduction of the steam pressure, and this is an inherent feature of the Rankine cycle. Whereas, in the case of the general purpose steam, as shown in FIG. 5(2), when it is intended to do the same amount of work, even if the steam pressure $P_2$ is reduced, there is no need to increase the quantity of heat $Q_2$ to be recovered. Thus the problem of the prior art apparatus is that two kinds of steam having different requirements have to be extracted at the same pressure.

In the case where the quantity of heat $Q_2$ required for generating the general purpose steam (FIG. 5(2)) is far less than the quantity of heat $Q_1$ required for generating the steam D for driving a turbo-generator (FIG. 5(1)), then the above-described problem can be disregarded, but generally in the case of $Q_1/Q_2=2\sim4$, the above problem cannot be disregarded.

Therefore, for the purpose of increasing the quantity of heat recovered from the exhaust gas, it is necessary to reduce the saturation temperature by selecting a lower steam pressure. However, if the steam pressure is merely reduced without any other factors being taken into account, then an increase in size of the steam turbine 2 and a further reduction of the generation of electric power will result.

Figure 6:
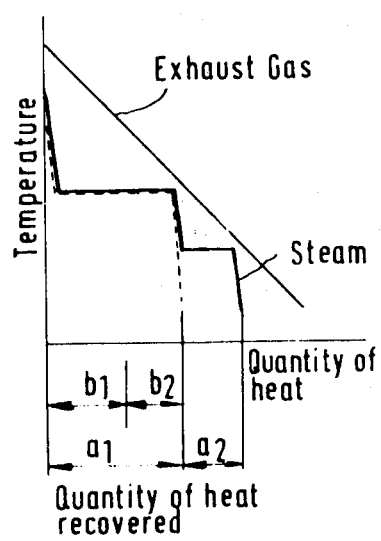
Figure 7:
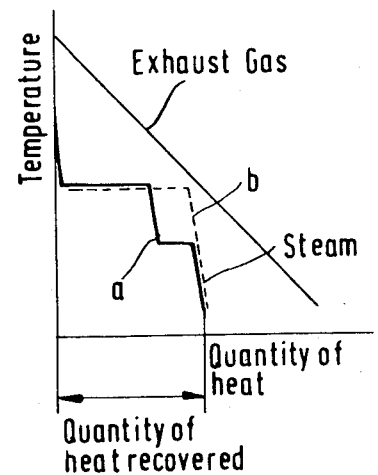

FIGS. 6 and 7 compare the mode of recovering the heat of the hot exhaust gases between the apparatus according to the present invention and the prior art apparatus. In these figures, reference character a represents the case of the apparatus according to the present invention, while b represents the case of the prior art apparatus. Also, suffix 1 represents the quantity of heat used in the form of steam for driving a turbo-generator, while suffix 2 represents the quantity of heat used in the form of general purpose steam.

FIG. 6 illustrates one example of comparison of the maximum amount of heat recovered between the apparatus according to the present invention and the prior art apparatus. As will be self-explanatory from this figure, in the case of the present invention the heat recovered is increased by 20–50% in comparison with the case of the prior art apparatus. In such cases, since the heat to be recovered in the form of general purpose steam is substantially the same between the apparatus according to the present invention and the prior art apparatus ($a_2=b_2$), the aforementioned increase of the total heat recovered in itself means an increase of the electric power generated.

FIG. 7 illustrates the temperature differences between the exhaust gas and the generated steam with respect to the apparatus according to the present invention (solid line a) and the prior art apparatus (dash line b), assuming that the total heat recovered from the exhaust gases is the same (the sum of the heat of the steam for driving a turbo-generator and the heat of the general service steam is the same). As will be seen from this figure, since the apparatus according to the present invention (a) can operate at a temperature difference between the exhaust gas and the generated steam which is larger than that of the prior art apparatus (b), the heat transmission area in the exhaust gas economizer 1 can be made smaller.

FIG. 8 shows the relationship between the generation of electric power and the heat transmission area in the exhaust gas economizer with respect to the apparatus according to the present invention (a) and the prior art apparatus (b), which were calculated on the basis of experimental results for a case where a 2-cycle diesel engine having a rated output of 17,400 SHP was used as a prime mover. As will be apparent from this figure, by way of example, in the case of electric power generation of 1.0, the heat transmission area in the apparatus according to the present invention (a) can be reduced by about 30% with respect to the prior art apparatus (b).

As fully described above, the present invention can afford the following advantages over the prior art:

(1) Since the steam generator section of an exhaust gas economizer is divided into a high pressure generator section for generating high pressure steam to drive a steam turbine of a turbo-generator and a low pressure steam generator section for generating low pressure steam for general purposes, and since the pressure of feed water introduced to these two steam generator sections is regulated by means of pressure regulator devices, relatively high pressure steam and low pressure steam corresponding to the pressures preset by the pressure regulator devices can be generated in a well-balanced proportion, the high pressure steam is used for driving the steam turbine of the turbo-generator, while the low pressure steam is used as the general purpose steam, and thereby an increase of the total heat recovered from the exhaust gas can be achieved.

(2) In addition, since a low pressure steam separator device is provided in the low pressure general purpose steam line to separate water from the saturated low pressure steam in said separator device, and since this water is mixed with feed water supplied to an exhaust gas economizer within a primary feed water heater, preheating of the feed water can be achieved simply by mixing hot water with the feed water, as distinct from the prior art heat exchanger. Consequently, up to 100% of the heat of the saturated water can be added to the feed water, and the primary feed water heater itself can be manufactured at low cost.

(3) Still further, since in addition to said feed water preheater there is provided a secondary feed water preheater in which feed water is heated by surplus steam extracted by steam pressure regulator devices from a high pressure steam line and a low pressure general purpose steam line, respectively, in addition to the heat of the water from the saturated steam on the low pressure side, the heat of the surplus steam both on the high and low pressure sides can be utilized effectively, and also the pressures in the high-pressure and low-pressure steam lines can always be maintained at the proper pressure values by means of the steam pressure regulator devices. Therefore, in addition to the advantages (1) and (2) above, further increases of heat recovery can be achieved.

Therefore, the present invention can enhance the electric power generation of the turbo-generator in comparison with the type of apparatus for recovering heat from the exhaust gases in the prior art, and furthermore, since the heat transmission area in the exhaust gas economizer can be made smaller than that in the prior art apparatus, provided that the generation of electric power is the same for the respective apparatus, the exhaust gas economizer can be made lighter in weight and smaller in size, and accordingly, the manufacturing cost of the apparatus can be reduced.

What we claim is:

1. Apparatus for recovering heat from the exhaust gases of marine prime movers comprising a feed water line; an exhaust gas economizer for effecting heat exchange between the exhaust gases discharged from the prime mover and feed water supplied from a feed water tank; said exhaust gas economizer having a high pressure steam generator section for receiving high pressure feed water and generating high pressure steam for use in driving a steam turbine, and a low pressure steam generator section for receiving low pressure feed water for generating general purpose steam for use for purposes other than driving said steam turbine; a pressure regulator device connected between said feed water line and said low and high pressure steam generator sections for regulating the pressure of said feed water to provide relatively low pressure and high pressure feed water to the respective steam generator sections; a low pressure steam separator device connected at the outlet of said low pressure steam generator section for separating water from said general purpose steam; and a primary feed water preheater in said feed water line and connected to said low pressure steam separator device for mixing the water separated from said general purpose steam by said low pressure steam separator device and the feed water supplied to said exhaust gas economizer and thereby preheating said feed water.

2. Apparatus as claimed in claim 1 comprising a low pressure steam pressure regulator device connected to the outlet of said low pressure steam generator sections for regulating the pressure of the general purpose steam, a high pressure steam pressure regulator device connected to the outlet of said high pressure steam generator section for regulating the pressure of the high pressure steam to said steam turbine, and a secondary feed water preheater in said feed water line downstream of said primary feed water heater and connected to said steam pressure regulator for effecting heat exchange between feed water passing therethrough from said primary feed water preheater and low pressure surplus steam extracted by said low pressure steam pressure regulator device as well as high pressure surplus steam extracted by said high pressure steam pressure regulator device.

3. Apparatus as claimed in claim 1 or claim 2 further comprising a low pressure feed water pump in said feed water line between said primary feed water preheater and the low pressure steam generator section in said exhaust gas economizer for supplying feed water under pressure from said primary feed water preheater to the low pressure steam generator section in said exhaust gas economizer and thereby to circulate said feed water through said low pressure steam generator section, said low pressure steam separator device and said primary feed water preheater, and a high pressure feed water pump connected between said pressure regulator device and the inlet to said high pressure steam generator section circulating the feed water through said high pressure steam generator section, whereby the supply of feed water to the exhaust gas economizer, the circulation of low pressure feed water through the low pressure steam generator section, and the circulation of high pressure feed water through the high pressure steam generator section is effected by means of said two feed water pumps.

* * * * *